(12) United States Patent
Ng et al.

(10) Patent No.: US 7,641,139 B2
(45) Date of Patent: Jan. 5, 2010

(54) CLUTCH DEVICE FOR SEATBELT RETRACTOR

(75) Inventors: Kevin Wei-Loong Ng, Rochester, MI (US); James L. Webber, Shelby Township, MI (US)

(73) Assignee: Delphi Technologies, Inc., Troy, MI (US)

( * ) Notice: Subject to any disclaimer, the term of this patent is extended or adjusted under 35 U.S.C. 154(b) by 134 days.

(21) Appl. No.: 11/838,291

(22) Filed: Aug. 14, 2007

(65) Prior Publication Data

US 2008/0041651 A1 Feb. 21, 2008

Related U.S. Application Data

(60) Provisional application No. 60/838,901, filed on Aug. 18, 2006.

(51) Int. Cl.
*B65H 75/48* (2006.01)
(52) U.S. Cl. .................. 242/375; 242/382.5; 242/384.2
(58) Field of Classification Search .................. 242/374, 242/375, 382.5, 384.2
See application file for complete search history.

(56) References Cited

U.S. PATENT DOCUMENTS 4,948,066 A * 8/1990 Matsumoto et al. ...... 242/382.2
6,840,474 B2 * 1/2005 Honl et al. .................. 242/374
6,857,594 B2 * 2/2005 Mori et al. .................. 242/374
7,083,136 B2 * 8/2006 Mori et al. ............... 242/390.8
7,484,683 B2 * 2/2009 Mori et al. .................. 242/374

\* cited by examiner

*Primary Examiner*—Sang Kim
(74) *Attorney, Agent, or Firm*—Thomas N. Twomey

(57) ABSTRACT

A quick acting clutch, the quick acting clutch comprising: a friction plate; a clutch plate movably mounted to the friction plate about a center of rotation of the friction plate and the clutch plate, the clutch plate being configured to rotate with respect to the friction plate; an actuator arm pivotally mounted to at least one of the friction plate or the clutch plate, the actuator arm being configured to amplify movement of a first end of the actuator arm and rotational movement of the friction plate relative to the clutch plate moves the first end of the actuator arm; and a lock pawl pivotally mounted to the clutch plate for movement between a locking position and an unlocking position, the lock pawl and a second end of the actuator arm each being configured to contact each other and rotational movement of the friction plate with respect to the clutch plate causes movement of the first end to be amplified at the second end such that the second end of the actuator arm and the actuator arm contacts the lock pawl and the lock pawl is moved from the locking position to the unlocking position.

22 Claims, 6 Drawing Sheets

CLUTCH DEVICE FOR SEATBELT RETRACTOR

CROSS REFERENCE TO RELATED APPLICATIONS

This application claims the benefit of U.S. Provisional Patent Application Ser. No. 60/838,901 filed Aug. 18, 2006 the contents of which are incorporated herein by reference thereto.

BACKGROUND

Exemplary embodiments of the present invention relate to an apparatus and method for taking up slack in a vehicle seat belt. More particularly, the present invention relates to a quick acting clutch for a seatbelt retractor.

Vehicles are provided with a seat belt and a seat belt retractor. Once the seat belt has been extended or unwound and a tongue is engaged into a latching or buckle device, it is desirable to retract or wind up an excess amount of the seat belt webbing.

Vehicle seat belts are also provided with an automatic winding device that, upon sensing of a predetermined condition will wind up a predetermined amount of slack or amount of seat belt webbing during a predetermined activation event (e.g., a massive deceleration or vehicle conditions sensed before an accident). This device employs a motor, which is energized to wind up the seat belt. During operation, a pretension signal will be sent to a motor of the retractor to retract a portion of the seat belt when an imminent danger or predetermined condition is detected.

Upon receipt of the pretension signal, the seatbelt retractor will respond by quickly tensioning the belt to a predetermined level and thereafter a pyrotechnic pre-tensioner and inflatable cushion deployments will follow if an event (e.g., collision) occurs. Some of the features of a seatbelt retractor are: it removes seat belt slack when an imminent danger is detected; and the seatbelt retractor will pull and hold an occupant in a designated position prior to the collision occurring. In addition, the seatbelt retractor is configured to work in harmony with a pyrotechnic pre-tensioning device in order to maximize the distance between the belted occupant and other parts of the vehicle.

If the imminent danger is avoided and no longer present (e.g., collision avoided), the seatbelt retractor is configured to reset itself and remain on a standby mode for the next pre-tensioning signal. In order to engage and disengage the motor from the spool containing the seat belt webbing a clutch mechanism is required to allow the motorized mechanism to i) engage and turn the spool on the seatbelt retractor when the motor receives an electrical signal from a control module, and to ii) disengage from the seatbelt retractor for normal everyday use, wherein extraction and retraction effort on the webbing is at a low comfortable level.

Accordingly, it is desirable to provide a clutch mechanism that quickly engages and disengages in response to sensed vehicle conditions.

SUMMARY OF THE INVENTION

In accordance with one non-limiting exemplary embodiment, the present invention relates to a seatbelt retractor. The primary use of a seatbelt retractor is to pretension a seatbelt system by removing slack in the webbing.

Exemplary embodiments of the present invention relate to a quick acting clutch for a seat belt retractor, the quick acting clutch comprising: a friction plate; a clutch plate movably mounted to the friction plate about a center of rotation of the friction plate and the clutch plate, the clutch plate being configured to rotate with respect to the friction plate; an actuator arm pivotally mounted to at least one of the friction plate or the clutch plate, the actuator arm being configured to amplify movement of a first end of the actuator arm and rotational movement of the friction plate relative to the clutch plate moves the first end of the actuator arm; and a lock pawl pivotally mounted to the clutch plate for movement between a locking position and an unlocking position, the lock pawl and a second end of the actuator arm each being configured to contact each other and rotational movement of the friction plate with respect to the clutch plate causes movement of the first end to be amplified at the second end such that the second end of the actuator arm and the actuator arm contacts the lock pawl and the lock pawl is moved from the locking position to the unlocking position.

In another exemplary embodiment, a seat belt retractor is provided. The seat belt retractor comprising: a motor for providing a driving force to a gear train coupled to a ring gear; a quick acting clutch positioned within the ring gear, the quick acting clutch comprising: a friction plate; a clutch plate; an actuator arm pivotally mounted between the friction plate and the clutch plate, the clutch plate having a stud received within an opening in the actuator arm; and a lock pawl pivotally mounted to the clutch plate for movement between a locking position and an unlocking position, the lock pawl having an actuation pin disposed in an elongated opening of the clutch plate and rotational movement of the friction plate with respect to the clutch plate causes rotational movement of the actuator arm, wherein the actuator arm contacts the actuation pin and the lock pawl is moved from the locking position to the unlocking position.

In another exemplary embodiment, a method for engaging a motor of a seat belt retractor is provided. The method comprising: pivotally mounting an actuator arm between a friction plate and a clutch plate; rotating the friction plate three degrees or less with respect to the clutch plate, wherein a feature of the friction plate causes the actuator arm to engage an actuator pin of a lock pawl pivotally mounted to clutch plate and the lock pawl engages a ratchet secured to a shaft of the seat belt retractor.

BRIEF DESCRIPTION OF THE DRAWINGS

FIGS. 12-12B illustrate engagement and disengagement of the quick acting clutch in accordance with an exemplary embodiment of the present invention.

DETAILED DESCRIPTION OF EXEMPLARY EMBODIMENTS

Figure 1:
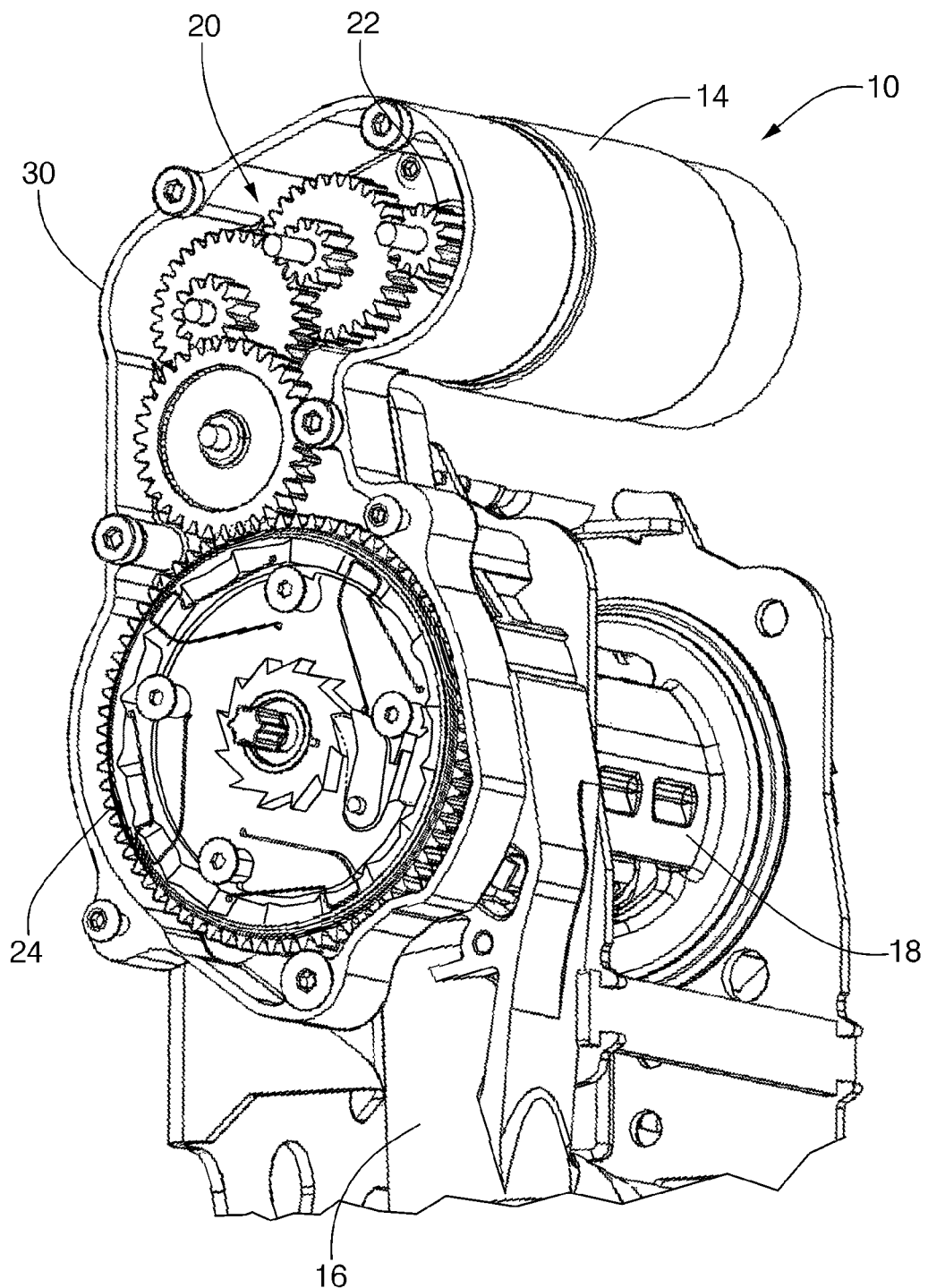
FIG. 1 is a partial perspective view of a seatbelt retractor constructed in accordance with an exemplary embodiment of the present invention.

Exemplary embodiments of the present invention relate to a seatbelt retractor. The primary use of a seatbelt retractor is to pretension a seatbelt system by removing slack on the webbing. A pretension signal will be sent to the retractor when an imminent danger is detected via pre-crash safety system. The seatbelt retractor will respond by quickly tensioning the belt to a predetermined level. Pyrotechnic pretensioner and airbag deployments will follow if an actual crash occurs. However, if the imminent danger is avoided and no longer present, the seatbelt retractor will reset itself and remain on a standby mode for the next pretensioning signal. Some primary benefits of a seatbelt retractor are: removal of seat belt slack when imminent danger is detected; pulling and holding of occupant into a desirable position prior to an actual crash.

Throughout the present specification, relative positional terms like 'upper', 'lower', 'top', 'bottom', 'front', 'rear', and the like are used to refer to the clutch and components in the orientation thereof shown in the drawings. These terms are used in the illustrative sense to describe the depicted embodiments, and are not meant to be limitative. It will be understood that in a particular application thereof, a clutch may be installed on a seatbelt retractor in an orientation different from that shown in the drawings, such as inverted 180 degrees or transverse to that shown, and in such a case, the above-identified relative positional terms may no longer be accurate.

Figure 2:
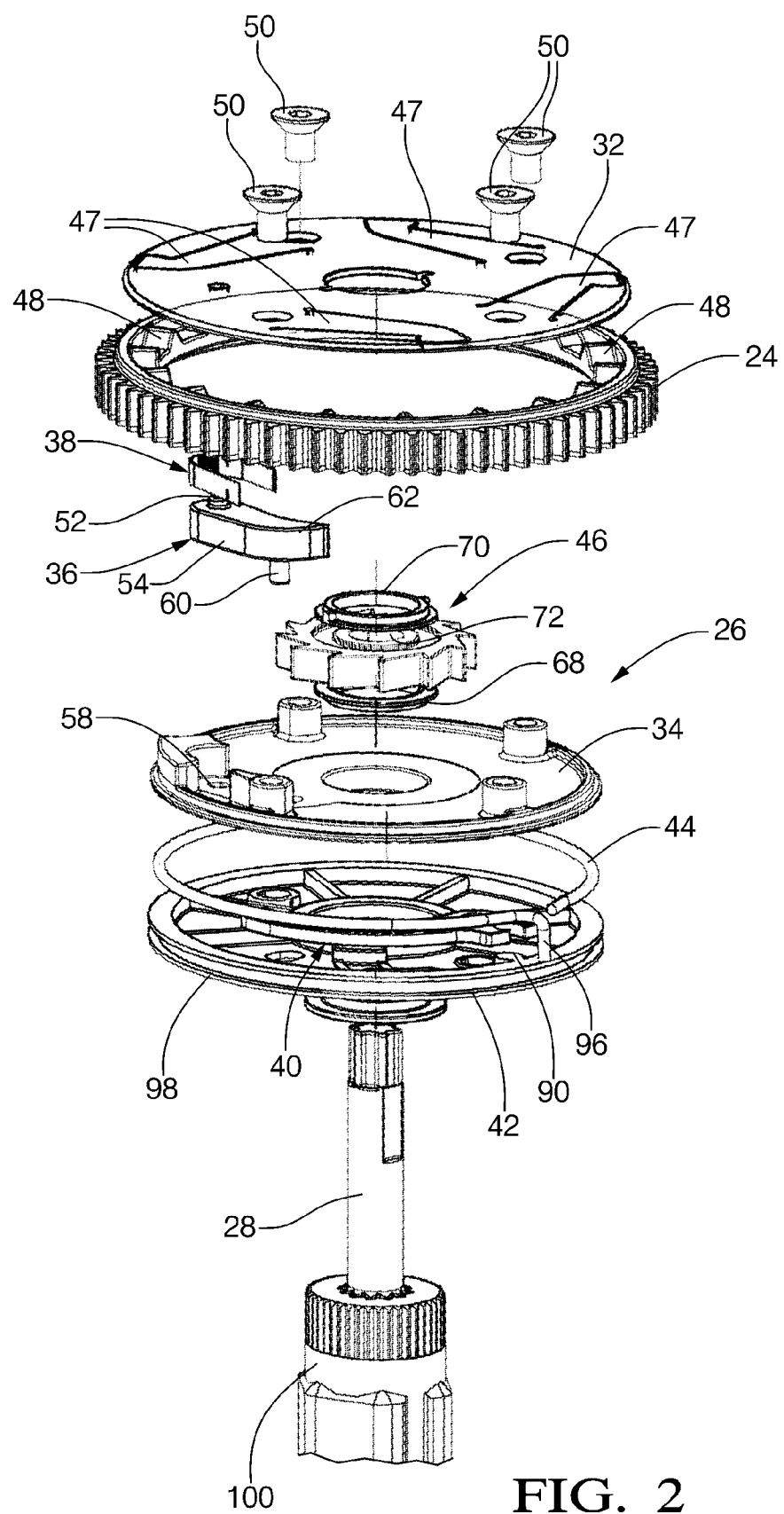
FIG. 2 is an exploded view of a quick acting clutch constructed in accordance with an exemplary embodiment of the present invention.
Figure 3:
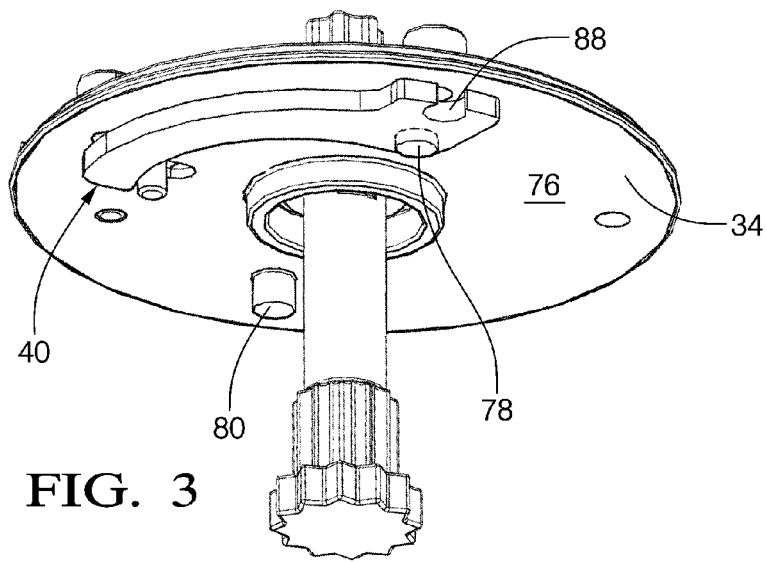
FIGS. 3 and 4 are perspective views of components of a quick acting clutch in accordance with exemplary embodiments of the present invention.

Referring now to FIGS. 1 and 2, an exploded view of a seat belt retractor 10 constructed in accordance with an exemplary embodiment of the present invention is illustrated. In one exemplary embodiment, the seatbelt retractor 10 comprises an automatic locking retractor (ALR) namely, a safety belt retractor that locks and maintains a fixed seat belt length during use or an emergency locking retractor (ELR) that allows the belt to move freely and locks only when the vehicle or occupant slows quickly/abruptly or stops suddenly or a combination (switchable) ELR/ALR retractor, a safety belt retractor that can be operated in the emergency locking mode for adults and switched to the automatic locking mode for use with a child safety seat.

In addition, the seat belt retractor 10 will further comprise a motor 14 and a pyrotechnic pre-tensioning device 16 each of which is intermittingly coupled to and/or provides a rotational force to a take-up spool 18 of the seatbelt retractor 10. The take-up spool 18 provides a surface for winding up a portion of a seat belt webbing (not shown).

In order to provide a rotational force to the spool 18, a gear train 20 is disposed between an output gear 22 of the motor 14 and a ring gear or output gear 24.

In order to provide a rotational force from the motor 14 to the spool 18 a clutch mechanism 26 is disposed between ring gear 24 and a spool connector shaft 28.

Accordingly, the seatbelt retractor 10 is commonly found as having a separate motorized mechanism integrated onto a standard seatbelt retractor. The main components of the motorized mechanism include the motor 14, the gear train 20, the clutch mechanism 26, and a housing 30.

Exemplary embodiments of the present invention relate to the clutch mechanism 26, which basically allows the motorized mechanism to i) engage and turn the spool 18 on the seatbelt retractor when the motor 14 receives an electrical signal from a control module, and to ii) disengage from the seatbelt retractor for normal use, wherein the extract and retract effort of the webbing is at a low or comfortable level.

Figure 4:
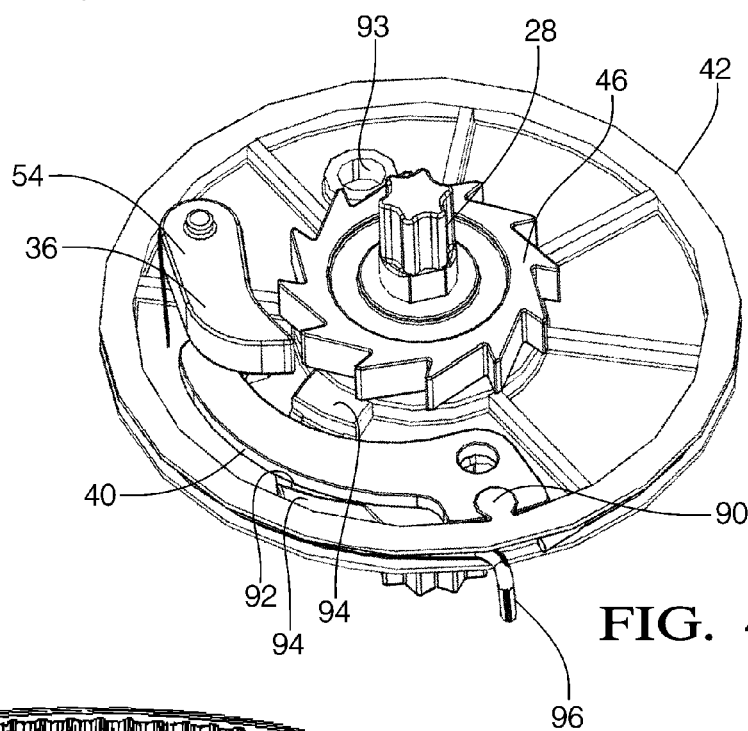
Figure 5:
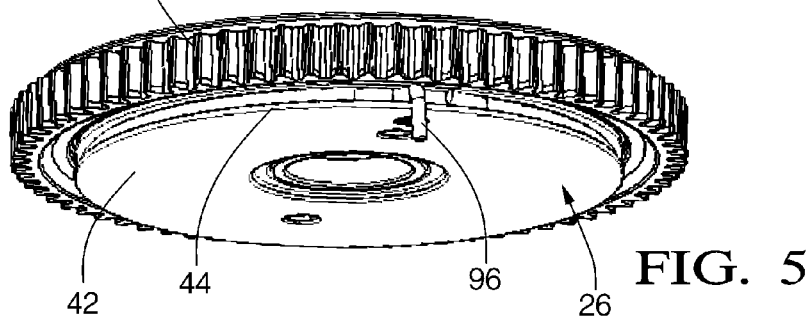
FIG. 5 is a perspective view of a quick acting clutch in accordance with exemplary embodiments of the present invention.

Referring now to FIGS. 2-11, the clutch mechanism 26 comprises gear 24, a clutch front plate 32, a clutch rear plate 34, a lock pawl 36, a lock pawl spring 38, an actuator arm 40, a friction plate 42, a friction plate spring 44, and a ratchet 46. FIG. 4 illustrates a portion of the clutch assembly without the clutch rear plate 34 in order to show the relative position of the actuator arm and lock pawl.

The lock pawl 36, lock pawl spring 38, and ratchet 46 are sandwiched between the clutch front plate 32 and clutch rear plate 34, within the gear 24. In one exemplary embodiment, the lock pawl spring 38 biases the lock pawl 36 into an unlocking position (e.g., non-engagement of the ratchet 46). In accordance with an exemplary embodiment, the clutch front plate 32 is made out of spring steel and has four legs 47 that are configured to be bend down and sit into valleys 48 of gear 24, when both the clutch front plate 32 and clutch rear plate 34 are secured and clamped axially to each other at four locations by a plurality of screws 50. The legs 47 of the spring are configured to provide a spring or biasing force and an overload protection feature wherein the portion of the spring leg received within the valley is deflected upward and the downwardly into an adjacent valley or valleys 48 as the rotational force is applied to the gear train and the lock pawl is still engaged to the ratchet. Thus, as the spring legs deflect upward the front clutch plate and the rear clutch plate can rotate with respect to the output gear and the spring legs are received in an adjacent cavity wherein the process continues until the overload force is no longer applied. In other words, the springs will allow the front clutch plate and the second clutch or rear plate 34 to rotate within the output gear 24 thus, the teeth of the output gear or any other gear are not stripped during an overload of force applied to the system. This is desirable in the event the motor 14 is applying a force to the gear train 20 and the clutch is engaged and the seat belt webbing is subjected to a force providing an opposite force in excess of predetermined tolerances, which are provided by the spring legs 47 of the clutch front plate 32. Although, four spring legs are shown it is understood that less than or more than four spring legs are contemplated to be within the scope of exemplary embodiments of the present invention.

The lock pawl 36 has pivot stubs 52 and 54, which match up with pivot holes 56 and 58 on the clutch front plate 32 and clutch rear plate 34. The lock pawl 36 has a post or actuation pin 60, towards a tapered end 62 of the lock pawl 36. The post 60 is configured to travel within an elongated opening 64 of the clutch rear plate 34 as well as make contact with the actuator arm 40. In order to position the lock pawl 36 in its disengage/store position (e.g., non-engagement position with respect to the ratchet 46) the lock pawl spring is positioned to bias the lock pawl 36 into the non-engaging position. In an alternative exemplary embodiment, the actuator arm 40 may be configured to have a post to make contact with the lock pawl 36.

The ratchet 46 is disposed radially to the clutch front plate 32 and the clutch rear plate 34. The radial and axial positions are further guided by a pair of bearings 68 and 70. In one exemplary embodiment, bearings 68 and 70 are DELRIN bearings or any other equivalent bearing. The inner diameter of the ratchet 46 has a double-D feature or opening 72, which allows a complimentary feature of the spool connector shaft 28 to slide in axially and prevents it from rotating independently.

A top surface 74 of the clutch rear plate top plane houses the lock pawl 36, lock pawl spring, and ratchet 46 while a lower surface 76 of the rear plate has two over travel posts or studs 78 and 80 that are spaced 180 degrees apart and disposed on a common radius. Posts 78 and 80 have two functions, which relate to the actuator arm 40 as i) a pivoting axis and ii) an anti over travel feature.

In accordance with an exemplary embodiment the actuator arm is pivotally mounted between the rear clutch plate and the friction plate. The actuator arm 40 has a pivot hole 82 that pivots on one of the posts 78, 80 positioned on the lower surface 76. It being understood that the actuator arm is pivotally mounted to either the friction plate or the clutch rear plate and the other is configured to manipulate the actuator arm. A longer arm portion or second end portion 84 of the actuator arm 40 is positioned to contact the lock pawl post or actuation pin 60 in a push-slide manner, which in turn moves the lock pawl 36 in and out of engagement. A shorter arm portion or first end portion 86 of the actuator arm 40 has an open-ended hole 88 that comes into contact with a feature or post 90 on the friction plate 42.

In accordance with an exemplary embodiment, and utilizing a long-short arm approach, a small movement on the shorter arm portion can initiate a large swing on the longer arm portion. Thus, amplification of a very small movement between the friction plate 42 and the clutch rear plate 34 will cause quick engagement and disengagement of the lock pawl 36. Or course, other configurations of the actuator arm 40 are contemplated as long as the desired amplification is provided. Accordingly, a quick acting engagement and disengagement of the lock pawl 36 is provided.

Since the friction plate 42 is disposed underneath the clutch rear plate 34, there is a cavity 92 amongst ribbings 94 that house the actuator arm 40. Post 90 contacts the open-ended hole 88 on the actuator arm 40. The friction plate spring 44 has one leg 96 fixed to the housing 30 while the remainder wraps around a groove 98 on the friction plate 42. This arrangement provides some resistance to retard the friction plate 42 from rotation during an initial gear train movement. The retardation creates a relative movement between the friction plate 42 and the clutch rear plate 34, which forces the shorter arm of the actuator arm 40 to move.

Movement of the actuator arm 40 causes engagement of the lock pawl 36 with the ratchet 46 via pivotal movement of the actuator arm 40 and the lock pawl 36. In accordance with an exemplary embodiment, and when gear 24 is driven in the clockwise direction, all the components that are connected radially, axially, and pivotally rotate together in the same direction (e.g., clutch front plate 32, clutch rear plate 34, lock pawl 36. During this initial movement, the resistance on the friction plate 42 with the friction plate spring 44 will generate a relative movement between the friction plate 42 and the clutch rear plate 34. This will cause the actuator arm 40 to push the lock pawl 36 into engagement with the ratchet 46.

The over travel posts on the clutch rear plate 34 (e.g., 78 and 80), as described above, are received within and blocked by corresponding holes 93 on the friction plate 42 to prevent exertion of additional force onto the actuator arm 40 once the lock pawl 36 is in engagement. Once in engagement, the friction plate 42 continues to rotate together with gear 24, while dragging along on the friction plate spring 44. For example, and in accordance with an exemplary embodiment of the present invention at least one of the holes 93 is slightly larger than the outer periphery of the over travel posts 78 and 80 in order to allow slight relative movement between the friction plate and the clutch rear plate in order to cause movement of the actuator arm. In accordance with one exemplary embodiment the hole 93 that receives the post that does not support the actuator arm is received in an elongated opening 93 that is slightly larger than the post. As illustrated post 80 is received in opening 93, which is larger than post 80. Also, it is understood that post 78 may be configured to only pivotally receive the actuator arm and not extend into an opening in friction plate 42 or alternatively the opening in friction plate 42 is configured to not allow relative movement of post 78 in the opening while post 80 is allowed to move accordingly. In yet another alternative both posts 78 and 80 are received in openings 93 that are slightly larger than the outer periphery of the posts in order to allow for relative movement between the friction plate and the rear clutch plate in order to cause movement of the actuator arm.

In engagement, the ratchet 46 will rotate in unison with gear 24, which in turn rotates the spool connector shaft 28, which in turn rotates a spool connector base 100, which in turn rotates the spool 18.

On the other hand and in order to provide disengagement and when gear 24 is driven in the counter clockwise direction, the opposite event occurs namely, the relative movement between the friction plate and clutch rear plate 34 causes the actuator arm 40 to swing out, which allows the lock pawl spring to snap the lock pawl 36 out of engagement due to the biasing force of spring 38. Now, the ratchet 46 is totally disconnected from the gear 24. Another means of disengagement occurs when the gear train 20 is back-driven while the clutch is still in engagement. This occurs more easily when the motor power is turned off. A back-driving scenario occurs when a rotational force (from pulling out the seatbelt webbing) on the spool 18 exceeds the rotational force generated by gear 24 (from the gear train 20). The minute rotational angle resulted from the back driving is enough to generate relative movement between the friction plate 42 and clutch rear plate 34, which in turn causes the actuator arm 40 to swing out to the disengagement position. As soon as the lock pawl 36 load is relieved from the ratchet 46 (from letting in the seatbelt webbing via a spring pack), the lock pawl spring will snap the lock pawl 36 out of engagement.

This clutch initiates engagement and disengagement by the rotational direction where the gear is turning. This makes it a very predictable clutch even at low speed engagement. Previous designs required a gear rotation of 28 degrees to get from full disengagement to full engagement, and vice-versa.

In accordance with an exemplary embodiment of the present invention, it only takes 3 degrees of rotation between the friction plate and the rear clutch plate to perform the same task, which is achieved by using the long-short arm approach. Accordingly, quick engagement and disengagement is provided, which allows the lock pawl 36 to drive into ratchet 46 (or vice-versa) when the gear train 20 is just about to spool up to speed. This reduces the occurrence of high impact load exerted on lock pawl 36 and ratchet teeth, and also reduces the chance tip-to-tip teeth clashes. Of course, engagement can be provided by rotational movement less than or greater than 3 degrees.

Figure 6:
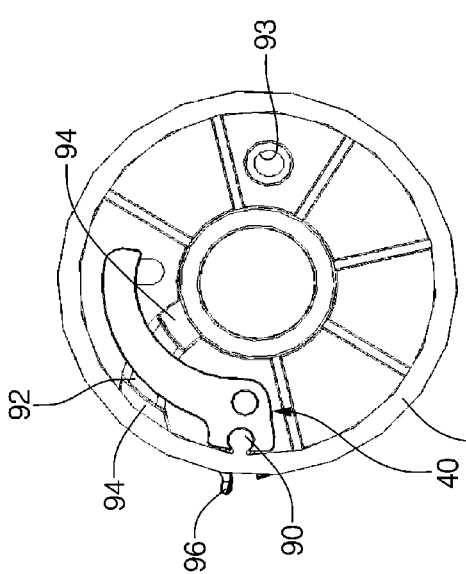
FIGS. 6-9 are plan views of components of the quick acting clutch in a disengagement position.
Figure 9:
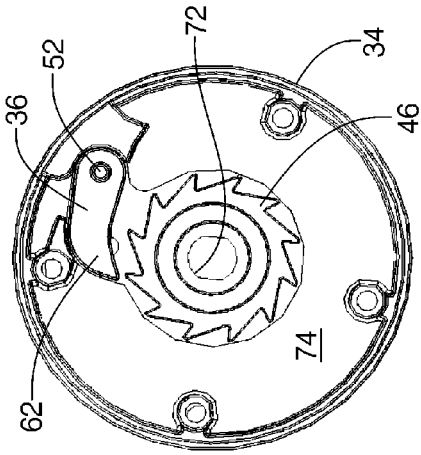
Figure 11:
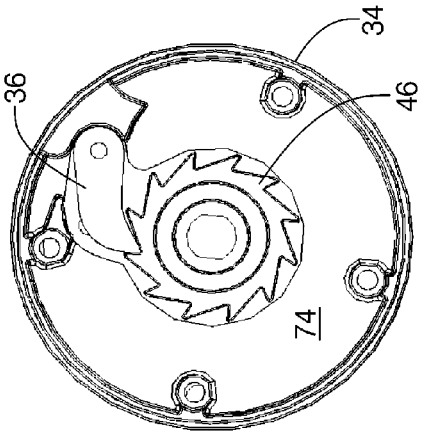
FIGS. 10 and 11 are plan views of components of the quick acting clutch in an engagement position.
Figure 7:
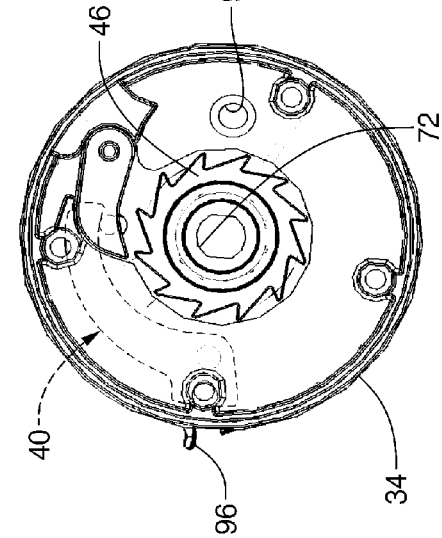
Figure 8:
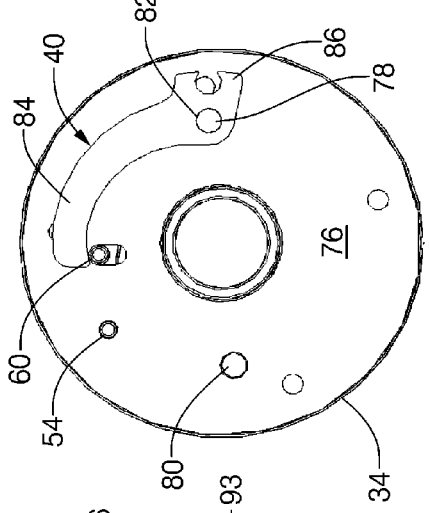
Figure 10:
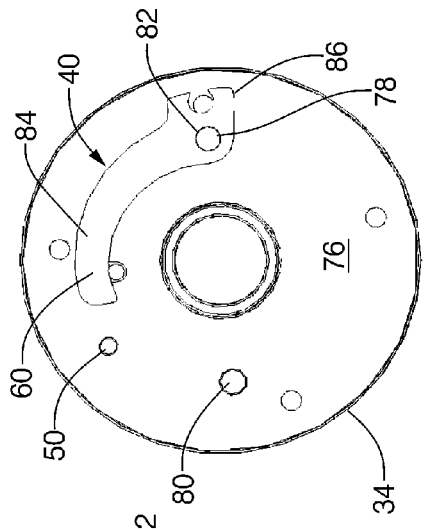

It should be noted that the actuator arm 40 is identified by a dashed line in FIG. 6 as the same is located on the other side of the clutch rear plate 34.

Figure 12:
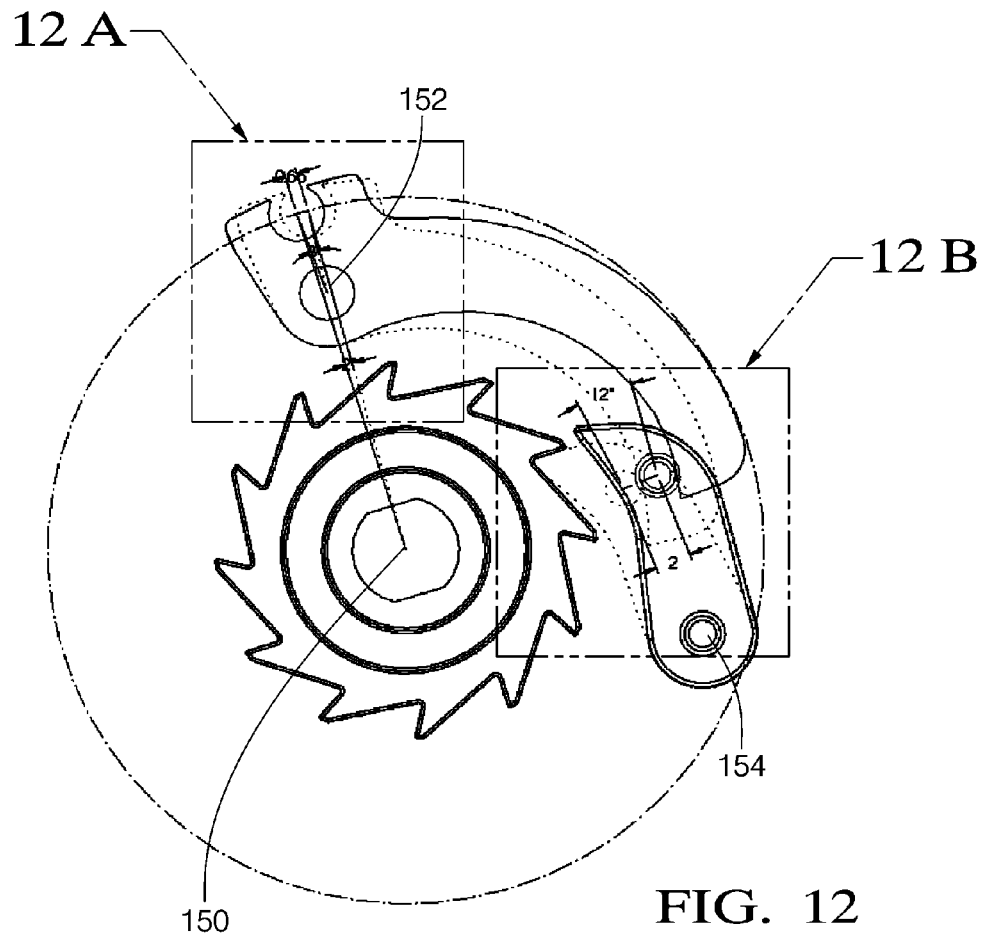
Figure 12:
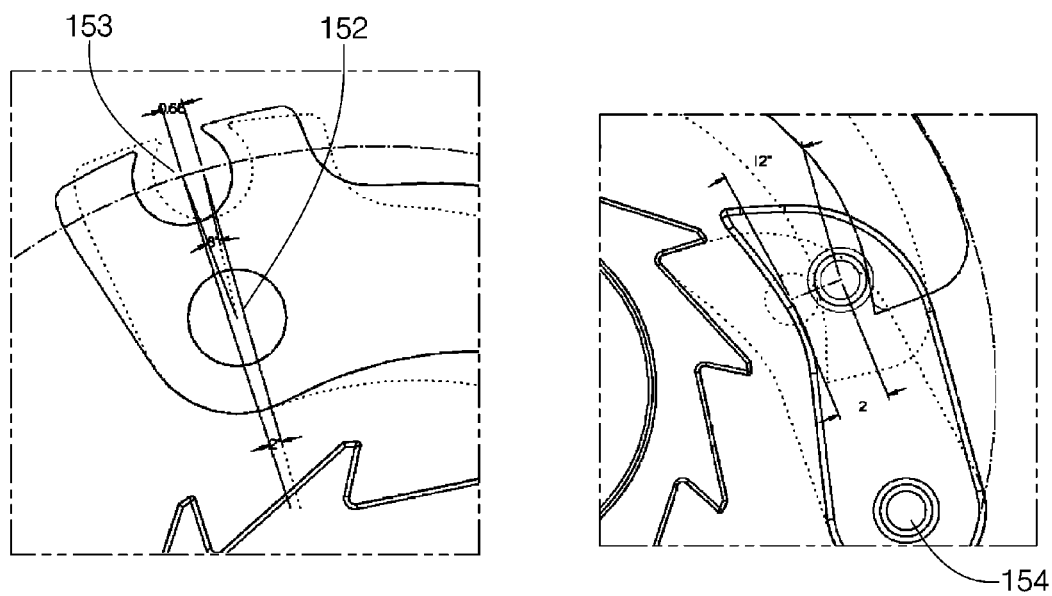

For example, and referring now to FIGS. 12-12B a non-limiting example of the operation of an exemplary embodiment of the present invention is illustrated. As shown in FIGS. 12-12B, 2 degrees of movement of the clutch rear plate 34 with respect to the friction plate 42 about a radius defined by a center point 150 of rotation of the clutch rear plate 34 with respect to the friction plate 42 and the periphery 43 of the clutch rear plate 34 and the friction plate 42, results in 8 degrees of movement or rotation of the first end or short arm 86 of the actuator arm 40 about a radius defined by a center point 152 of the pivotally mounting point of the actuator arm 40 to the clutch plate 34 and a center 153 of the open-ended hole 88 on the actuator arm 40. This amplification of movement of the first end 86 of the actuator arm is provided by locating the first end 86 of the actuator arm 40 and the point of pivotal mounting at the periphery 43 of the friction plate 42 and the clutch rear plate 34. Thus, a first end or short arm 86 of the actuator arm 40 will travel approximately 8 degrees or 0.66 mm about a radius defined by center point 152 and the center 153 of the open-ended hole 88 of the first end or short arm 86 of the actuator arm 40.

In addition, and by pivotally mounting a short arm 86 and a long arm 84 of the actuator arm 40 about point 152 or other equivalents of short arm 86 and long arm 84 a further amplification of a second end or long arm 84 of the actuator arm 40 is provided. As illustrated, 12 degrees of rotation about a radius defined by an end of the lock pawl 36 and a center point 154 (e.g., the center point of rotational movement of the lock pawl 36 to the clutch plate) causes 2.0 mm of movement of an actuating point of contact between the lock pawl 36 and the second end or long arm 84 of the actuating arm, which is provided by 8 degrees of rotation of the first end of the actuating arm, which is in turn provided by 2 degrees of relative movement between the friction plate 42 and the clutch rear plate 34. Thus, amplification of the rotational movement of the friction plate is provided. This results in a very quick acting clutch.

Another advantage of the quick acting clutch of exemplary embodiments of the present invention is that there is a small "in-between" position that keeps the lock pawl 36 away from a "grey zone" between engagement and disengagement. The motivation behind this is to get the clutch acting in a digital manner, either in or out. In-between position can cause tip chipping that results in unreliable engagement. In certain cases, it also causes destructive tooth clashes.

The clutch of exemplary embodiments of the present invention can disengage when the gear train 20 is back-driven, as mentioned above. This provides a fail-safe feature in order to ensure that the clutch disengages in the event of malfunction of the motor 14. Once disengaged, the occupant can resume using the seatbelt in the normal fashion. Since the quick acting mechanism, which consists of a friction plate 42 and an actuation arm, are simply a slave mechanism, they are not subjected to high load or stress. This will ensure the clutch remains reliable and robust for the designed life of the retractor.

In addition, packaging is always a challenge in any application and is especially true for seat belt retractors having separate motorized mechanisms. In accordance with an exemplary embodiment, and by positioning the clutch components inside and under the gear 24, a slim and compact design is provided. Moreover, exemplary embodiments of the present invention do not extend outside the outer diameter of gear 24. In addition, gear 24 and the clutch can be treated as a subassembly before placing it into the motorized mechanism housing.

Figure 13:
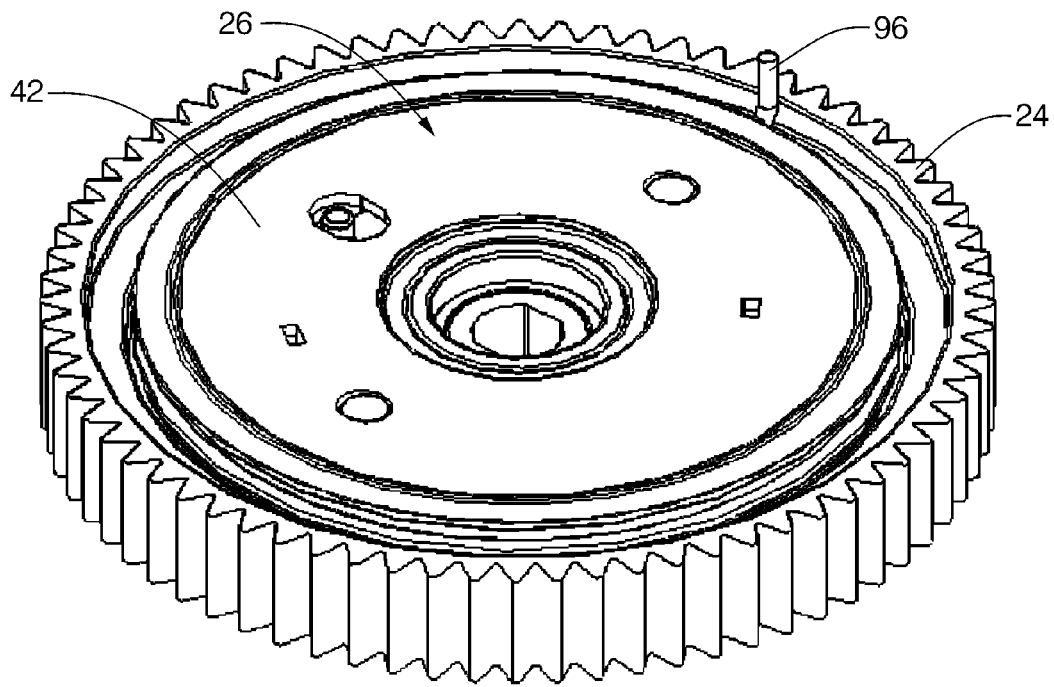
FIGS. 13 and 14 are perspective view of an output gear assembled with the quick acting clutch of an exemplary embodiment disposed therein.
Figure 14:
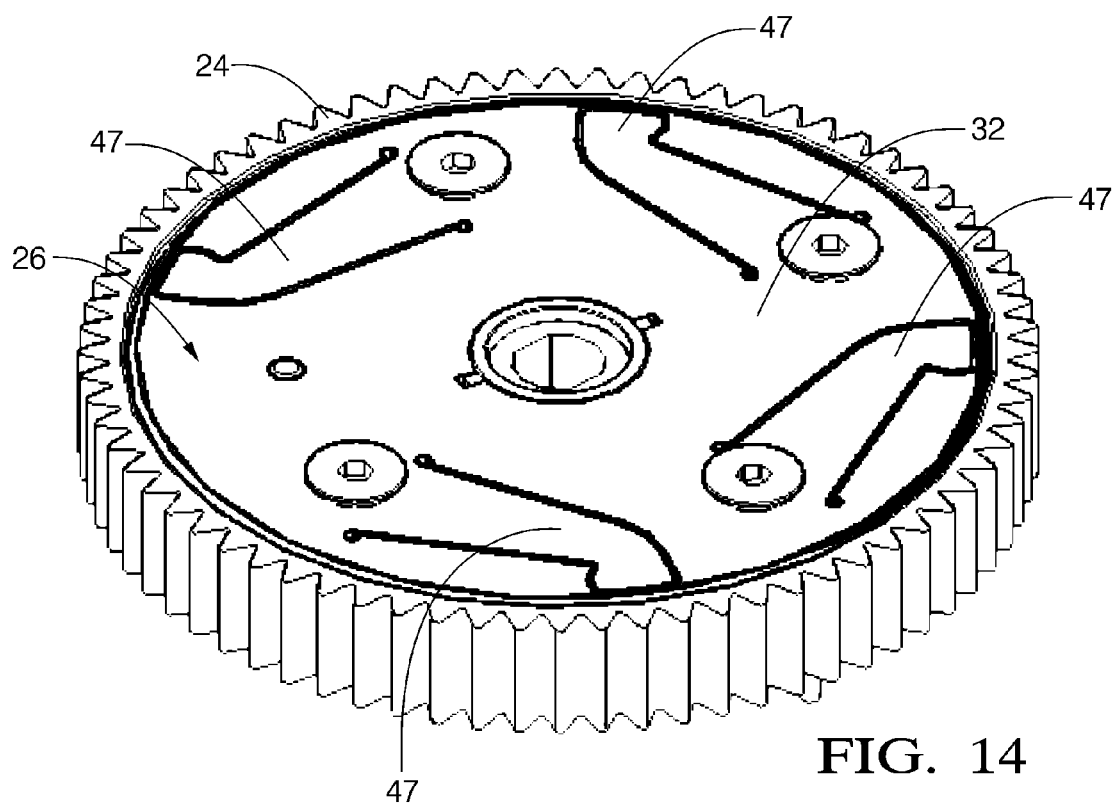

Examples of an assembled output gear 24 with the clutch assembly disposed therein are shown in FIGS. 13 and 14. As clearly illustrated all of the components are disposed within the inner diameter or opening of the output gear and the stack height is not greater than the height of the ring gear, the exclusion being leg 96 of the friction plate spring 44, which in an alternative embodiment may also be located within the area defined by the height and inner diameter of output gear 24.

In addition, and as illustrated in FIG. 1, all of these components are received within a cavity or receiving area defined by housing 30, which is secured to seatbelt retractor 10, wherein a housing cover (not shown) is secured thereto in order to enclose all of the components within the area defined by the housing. In addition, a webbing retract spring pack (not shown) is also secured to an exterior surface of the housing cover.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the present application.

What is claimed is:

1. A quick acting clutch, comprising:
a friction plate;
a clutch plate movably mounted to the friction plate about a center of rotation of the friction plate and the clutch plate, the clutch plate being configured to rotate with respect to the friction plate;
an actuator arm pivotally mounted to at least one of the friction plate or the clutch plate, the actuator arm being configured to amplify movement of a first end of the actuator arm, and rotational movement of the friction plate relative to the clutch plate moves the first end of the actuator arm; and
a lock pawl pivotally mounted to the clutch plate for movement between a locking position and an unlocking position, the lock pawl and a second end of the actuator arm each being configured to contact each other, and rotational movement of the friction plate with respect to the clutch plate causes movement of the first end to be amplified at the second end such that the second end of the actuator arm and the actuator arm contacts the lock pawl and the lock pawl is moved from the locking position to the unlocking position.

2. The quick acting clutch as in claim 1, wherein the lock pawl engages a ratchet rotatably received on the clutch plate and wherein the clutch plate and the friction plate have a range of rotation with respect to each other, wherein the range of rotation is up to and including 3 degrees of rotation.

3. The quick acting clutch as in claim 1, further comprising a friction plate spring disposed around a periphery of the friction plate.

4. The quick acting clutch as in claim 3, wherein the quick acting clutch is enclosed in a housing, and wherein the friction plate spring further comprises a leg depending away from the quick acting clutch and secured to the housing.

5. The quick acting clutch as in claim 1, wherein the actuator arm comprises a long arm portion terminating at the second end and a short arm portion terminating at the first end, wherein the actuator arm is pivotally mounted to a first post of the clutch plate between the long arm portion and the short arm portion, and a second post of the clutch plate is received within an opening in the friction plate, the opening being slightly larger than the second post, wherein the opening in the friction plate defines limits of rotation of friction plate with respect to the clutch plate.

6. The quick acting clutch as in claim 5, wherein the friction plate comprises a post, and wherein the first end is located proximate to the periphery of the friction plate and the first end further comprises an opening configured to receive the post, wherein the actuator arm is moved by engagement with the post.

7. The quick acting clutch as in claim 6, wherein the lock pawl is rotated into the locking position after three degrees of rotation of the clutch plate with respect to the friction plate.

8. The quick acting clutch as in claim 1, wherein 0-2 degrees of rotational movement of the clutch plate with respect to the friction plate causes 0-2 mm of movement of a portion of the lock pawl.

9. The quick acting clutch as in claim 1, wherein the lock pawl engages a ratchet rotatably received between the clutch plate and another clutch plate, and the quick acting clutch is received within an inner diameter of an output gear, and the friction plate and the another clutch plate are completely received within an inner opening defined by the output gear.

10. The quick acting clutch as in claim 9, wherein the another clutch plate is made out of spring steel and has a plurality of legs that are configured to depend away from the another clutch plate and are received within a plurality of valleys of the output gear, when both the clutch plate and the another clutch plate are secured to each other within the output gear such that the plurality of legs of the another clutch plate are configured to provide an overload protection feature, wherein a portion of the plurality of legs is received within any one of the plurality of valleys and the portion is deflected upwardly and then downwardly into an adjacent valley of the plurality of valleys in order to allow the clutch plate and the another clutch plate to rotate within the output gear when the lock pawl is still engaged with the ratchet.

11. The quick acting clutch as in claim 9, further comprising a friction plate spring disposed around a periphery of the friction plate, wherein the quick acting clutch is enclosed in a housing, and the friction plate spring further comprises a leg depending away from the quick acting clutch and secured to the housing, wherein the leg extends away from an inner opening defined by the output gear.

12. A seat belt retractor, comprising:
a motor for providing a driving force to a gear train coupled to a ring gear;
a quick acting clutch positioned within the ring gear, the quick acting clutch comprising:
a friction plate;
a clutch plate comprising a rear plate and a stud depending from the rear plate;
an actuator arm pivotally mounted between the friction plate and the clutch plate, said actuator arm comprising an opening receiving the stud; and
a lock pawl pivotally mounted to the clutch plate for movement between a locking position and an unlocking position, the lock pawl having an actuation pin disposed in an elongated opening of the clutch plate and rotational movement of the friction plate with respect to the clutch plate causes rotational movement of the actuator arm, wherein the actuator arm contacts the actuation pin and the lock pawl is moved from the locking position to the unlocking position.

13. The seat belt retractor as in claim 12, further comprising a ratchet rotatably received on the clutch plate, the ratchet being secured to a take up spool of the seat belt retractor.

14. The seat belt retractor as in claim 13, wherein the lock pawl engages the ratchet, and the clutch plate and the friction plate have a limited range of rotation with respect to each other, wherein the limited range of rotation is 3 degrees and less.

15. The seat belt retractor as in claim 12, further comprising a housing and a friction plate spring disposed around a periphery of the friction plate, and the friction plate spring further comprises a leg depending away from the quick acting clutch, said leg being configured to engage the housing.

16. The seat belt retractor as in claim 13, wherein the actuator arm comprises a long arm portion and a short arm portion, and the actuator arm is pivotally mounted to either the friction plate or the clutch plate between the long arm portion and the short arm portion.

17. The seat belt retractor as in claim 16, wherein the actuator arm is pivotally mounted to a first post of the clutch plate between the long arm portion and the short arm portion, and a second post of the clutch plate is received within an opening in the friction plate, the opening being slightly larger than the second post, wherein the opening in the friction plate defines limits of rotation of friction plate with respect to the clutch plate.

18. The seat belt retractor as in claim 17, wherein the friction plate comprises a post, and wherein the short arm portion of the actuator arm is configured to engage the post.

19. The seat belt retractor as in claim 18, wherein 0-2 degrees of rotational movement of the clutch plate with respect to the friction plate causes 0-2 mm of movement of a portion of the lock pawl.

20. The seat belt retractor as in claim 12, wherein the lock pawl is rotated into the locking position after three degrees of rotation of the clutch plate with respect to the friction plate.

21. A method for engaging a motor of a seat belt retractor, comprising:
pivotally mounting an actuator arm between a friction plate and a clutch plate, wherein the friction plate comprises a post;
rotating the friction plate three degrees or less with respect to the clutch plate, wherein the actuator arm receives the post and moves the actuator arm to engage an actuator pin of a lock pawl pivotally mounted to clutch plate and the lock pawl engages a ratchet secured to a shaft of the seat belt retractor.

22. A seat belt retractor, comprising:
a motor for providing a driving force to a gear train coupled to a ring gear;
a quick acting clutch positioned within the ring gear, the quick acting clutch comprising:
a friction plate;
a clutch plate, the clutch plate and the friction plate being capable of limited rotation with respect to each other about a center of rotation of the friction plate and the clutch plate;
an actuator arm pivotally mounted to at least one of the clutch plate and the friction plate, the actuator arm being configured to amplify rotational movement of a first end of the actuator arm, and rotational movement of the friction plate with respect to the clutch plate moves the first end of the actuator arm; and
a lock pawl pivotally mounted to the clutch plate for movement between a locking position and an unlocking position, the lock pawl and the actuator arm each being configured to contact each other, and rotational movement of the friction plate with respect to the clutch plate causes rotational movement of the actuator arm such that the actuator arm contacts the lock pawl and the lock pawl is moved from the locking position to the unlocking position.

* * * * *